(12) United States Patent
Hwang et al.

(10) Patent No.: US 8,031,641 B2
(45) Date of Patent: Oct. 4, 2011

(54) METHOD AND SYSTEM FOR SERVING MULTI-MEDIA DATA BETWEEN HETERO UPNP NETWORKS

(75) Inventors: Tae-In Hwang, DaeJeon (KR); Ho-Jin Park, DaeJeon (KR); Hae-Ryong Lee, DaeJeon (KR); Kwang-Rho Park, DaeJeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 407 days.

(21) Appl. No.: 12/187,469

(22) Filed: Aug. 7, 2008

(65) Prior Publication Data

US 2009/0147794 A1 Jun. 11, 2009

(30) Foreign Application Priority Data

Dec. 10, 2007 (KR) ........................ 10-2007-0127911

(51) Int. Cl.
*H04L 12/16* (2006.01)
*H04L 12/28* (2006.01)
*H04L 12/56* (2006.01)
*H04B 3/30* (2006.01)
(52) U.S. Cl. .... 370/260; 370/285; 370/401; 379/202.01
(58) Field of Classification Search .................. 370/260, 370/285, 401
See application file for complete search history.

(56) References Cited

U.S. PATENT DOCUMENTS

| 7,325,057 | B2 | 1/2008 | Cho |
| 2005/0160172 | A1 | 7/2005 | Eytchison |
| 2006/0143295 | A1 | 6/2006 | Costa-Requena et al. |
| 2006/0245403 | A1 | 11/2006 | Kumar |
| 2007/0214241 | A1 | 9/2007 | Song et al. |

FOREIGN PATENT DOCUMENTS

| KR | 1020030088723 | 11/2003 |
| KR | 1020040005503 | 1/2004 |
| KR | 1020060125440 | 12/2006 |

OTHER PUBLICATIONS

Korean Notice of Allowance issued May 31, 2010 in corresponding Korean Patent Application 10-2007-0127911.
"A UPnP Proxy System for the Remote Control of Home Appliances" by Dong Hee Kim, et al. on Journal of Computing Science and Engineering (JCSE) as of 2004.
"UPnP-JXTA Bridging" by Gertjan Bogers et al. on TU/e Master Thesis as of 2004.
"A Proxy Technique for Media Content Sharing among UPnP-enabled Home Networks" by Hyun Ryong Lee, et al. on Proc. Of SPIE as of 2005.

*Primary Examiner* — Salman Ahmed
*Assistant Examiner* — Blanche Wong
(74) *Attorney, Agent, or Firm* — Staas & Halsey LLP

(57) ABSTRACT

Provided is a method and system for streaming multimedia data between hetero UPnP networks configured of a private network. The method comprises establishing a communication channel with a relay peer; establishing a virtual communication channel with a specific extensible home connector selected from a plurality of extensible home connectors connected with the relay peer; searching multimedia data to play from multimedia data in the specific extensible home connector which exists on the UPnP network through the virtual communication channel; establishing a communication environment through the UPnP internet gateway of the specific extensible home connector in case of demanding play of the searched multimedia data; and receiving multimedia data from the specific extensible home connector through the communication environment.

12 Claims, 3 Drawing Sheets

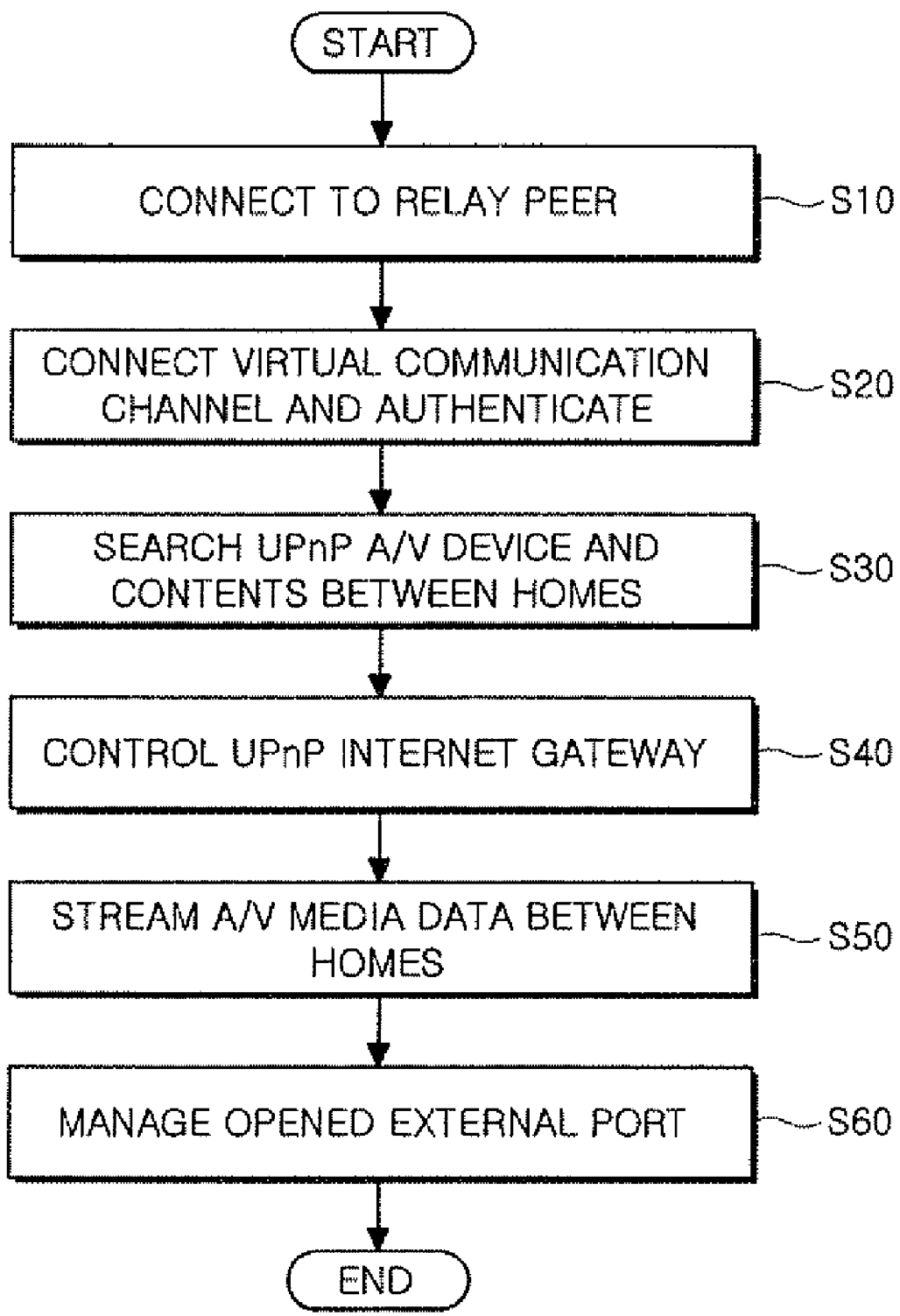

METHOD AND SYSTEM FOR SERVING MULTI-MEDIA DATA BETWEEN HETERO UPNP NETWORKS

CROSS-REFERENCE TO RELATED APPLICATIONS

This application claims priority under 35 U.S.C. §119 to Korean Patent Application No. 10-2007-127911, filed on Dec. 10, 2007, the disclosure of which is incorporated herein by reference in its entirety.

BACKGROUND OF THE INVENTION

1. Field of the Invention

The present disclosure relates to a UPnP network, and more particularly, to a method and system for streaming multimedia data between hetero UPnP networks each a private network.

This work was supported by the IT R&D program of MIC/IITA [2006-S-068-02, Development of Virtual Home Platform Based on Peer-to-Peer Networking]

2. Description of the Related Art

Universal Plug & Play (UPnP), introduced by Microsoft at 1999, is a technology for sharing a personal computer (PC) and peripheral devices, such as a printer, through a home network. Each of devices has a unique internet protocol (IP) address, uses internet-related protocols such as transmission control protocol/internet protocol (TCP/IP) and dynamic host configuration protocol (DHCP) for communicating with other devices, and communicates with other devices through an extensible markup language (XML). Hereinafter, networks supporting UPnP according to the related art will be described.

One of UPnP proxy algorithms according to the related art enables a user on the Internet to remotely control UPnP devices in home through a UPnP proxy installed in a home gateway or a home server. The UPnP Proxy algorithm supports unidirectional access and control from the Internet, the outside of a home network, to the home network, but cannot perform device discovery, device control, and a streaming service in bidirection between physically separated hetero UPnP networks.

According to the related art, hetero UPnP networks are connected using a juxtapose (JXTA) protocol. Due to a relay service, which is a core function of JXTA protocol, load of relay peers increases for transmitting multimedia data between UPnP audio/video (A/V) devices. Transmission delay also occurs because relay peers cache multimedia data to relay it to a target device.

Also, a multimedia streaming method according to the related art provide a multimedia streaming service using a virtual media server between UPnP based home networks. However, the multimedia streaming method according to the related art has problems as follows. A home connector must be installed in each of home networks, the home connector must be manually set up to connect a home network with another home network, and it is difficult to dynamically configure connections according to the movement of a user. Also, load is concentrated on a virtual media server because the virtual media server relays streaming data and collects contents information of each media server.

A mobility supporting technology according to the related art was introduced to support the mobility of a UPnP device. Since the mobility supporting technology according to the related art uses session initiation protocol (SIP), a mobile UPnP device must support SIP. Therefore, the mobility supporting technology must be redeveloped in order to apply it to typical UPnP devices not supporting SIP. Also, the mobility supporting technology cannot provide connectivity between hetero UPnP networks.

SUMMARY

Therefore, an object of the present invention is to provide a method and system for providing a multimedia service between hetero UPnP networks in order to handle extensibility of a UPnP protocol, continuity of a UPnP service according to movement of a user, UPnP message security and device authentication problem between home networks which are isolated from the outside by a network address converter or a fire wall.

To achieve these and other advantages and in accordance with the purpose(s) of the present invention as embodied and broadly described herein, a method for providing a multimedia service between hetero UPnP networks, the method comprising; establishing a communication channel with a relay peer; establishing a virtual communication channel with a specific extensible home connector selected from a plurality of extensible home connectors connected with the relay peer; searching multimedia data to play from multimedia data in the specific extensible home connector which exists on the UPnP network through the virtual communication channel; establishing a communication environment through the UPnP internet gateway of the specific extensible home connector in case of demanding play of the searched multimedia data; and receiving multimedia data from the specific extensible home connector through the communication environment.

To achieve these and other advantages and in accordance with the purpose(s) of the present invention, an apparatus for streaming multimedia data between hetero UPnP (Universal Plug & Play) networks each having a private network by connecting relay peers, the apparatus comprising: a message processor for transmitting and receiving a JXTA (juxtapose) message and a UPnP message in a local network isolated from the outside by accessing a JXTA based terminal-to-terminal communication network; a relay peer connecting processor for establishing a connection with the relay peers based on the message processor; and a gateway controller for confirming and controlling UPnP A/V devices in each of the hetero UPnP networks, processing generated events, and controlling a UPnP Internet gateway to open and close external ports of the UPnP Internet gateway based on the message processor To achieve these and other advantages and in accordance with the purpose(s) of the present invention, a system for providing a multimedia service through a hetero UPnP network connected through a virtual UPnP network, the system comprising: a relay peer for connecting hetero UPnP network devices through a virtual communication channel; a first UPnP network device for searching multimedia data corresponding to a search request, and streaming corresponding multimedia data to a specific UPnP network device that accesses a communication environment through authentication by opening an external port; and a second UPnP network device for requesting the first UPnP network device to search multimedia data, receiving the multimedia data from the first UPnP network device through the external port, and streaming the received multimedia data to the second UPnP network device.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 3 is a flowchart illustrating a method for providing a multimedia service between hetero UPnP networks according to an embodiment of the present invention.

DETAILED DESCRIPTION OF EMBODIMENTS

The present invention relates a system and method for providing a multimedia service between hetero UPnP networks, which enable a user to play contents in a media service located at the user's home using a multimedia service system located at a neighbor's home by connecting hetero UPnP networks each having a private network using a virtual UPnP network.

Hereinafter, preferred embodiments will be described based on necessary parts to clearly understand functions and operations of the present invention in detail with reference to the accompanying drawings.

Although a system and method for providing a multimedia service between hetero UPnP networks will be described in relation to particular embodiments thereof, many other variations and modifications and other user will become apparent to those skilled in the art. It is preferred, therefore, that the present invention not be limited by the specific disclosure herein.

In following descriptions, an extensible home connector is operated as an extensible home connecting server if the extensible home connector provides connection of an own UPnP network to another extensible home by directly providing an extensible home connecting service to another extensible home connector. Also, an extensible home connector operates as an extensible home connector client if the extensible home connector requests connection with another extensible home connector located in another UPnP network. The extensible home connector may be a terminal having mobility.

Figure 1:
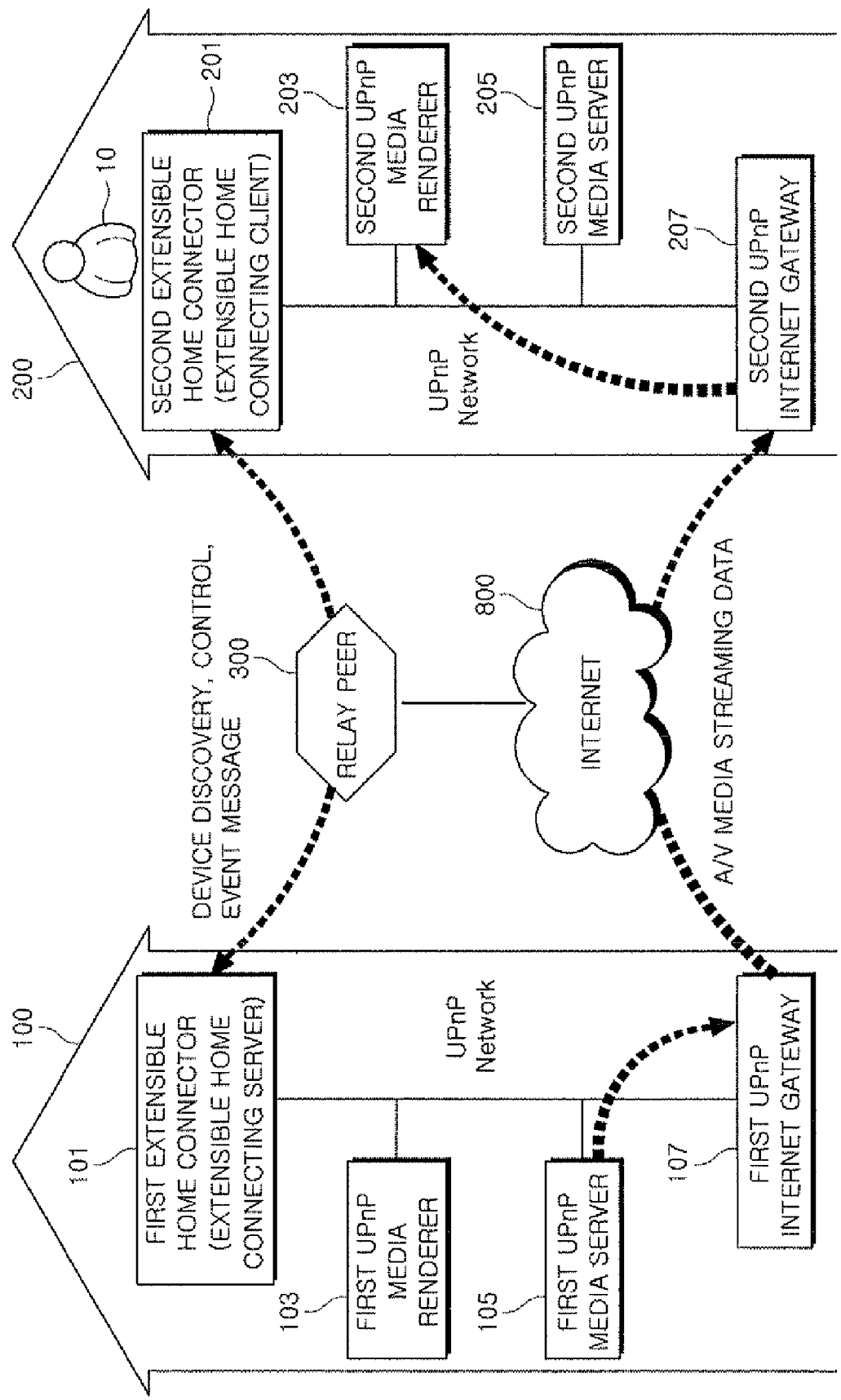
FIG. 1 is a diagram illustrating a system for providing a multimedia service between hetero UPnP networks according to an embodiment of the present invention.

FIG. 1 is a diagram illustrating a system for providing a multimedia service between hetero UPnP networks according to an embodiment of the present invention. In order to clearly describe the system for providing a multimedia service according to the present embodiment, it is assumed that multimedia data streaming is performed between hetero UPnP networks when a user 10 visits a second home 200 of another user from an own home 100.

At first, a first extensible home connector 101 in a first home 100 and a second extensible home connector 201 of a second home 200 are connected to a relay peer 300 on the Internet 800 in operation S10.

Then, the first extensible home connector 101 generates channel information through a communication channel between the first and second extensible home connectors 101 and 201 and the relay peer 300, generates a virtual receiving channel for advertisement, and advertises channel information. Here, it should be noted that the communication channel between the relay peers 300 is a different communication channel from a contents transfer path between the first and second extensible home connectors 101 and 102.

Then, the second extensible home connector 201 searches advertised channel information through the relay peer 300 and generates a unidirectional communication channel from the second extensible home connector 201 to the first extensible home connector 101 by binding a virtual transmitting channel generated using the searched channel information with a virtual receiving channel generated by the first extensible home connector 101.

The second extensible home connector 201 generates channel information, generates a virtual receiving channel for advertisement, and transmits an authentication inquiry message having the virtual receiving channel information of the second extensible home connector 201 to the first extensible home connector 101.

Then, the first extensible home connector 101 authenticates the second extensible home connector 201. If the authentication is normally processed, the first extensible home connector 101 forms a unidirectional virtual communication channel from the first home connector 101 to the second extensible home connector 201 by binding the generated virtual transmitting channel to the virtual receiving channel generated by the first extensible home connector 101 using the channel information of the second extensible home connector 201.

The first extensible home connector 101 transmits an authentication response message through the generated unidirectional communication channel from the first home connector 101 to the second home connector 201, and the second extensible home connector 201 authenticates the first home connector 101 using the transmitted authentication response message.

The second extensible home connector 201 requests not only searching a second UPnP media renderer 203 and a second UPnP media device 205 but also searching a first UPnP media renderer 103 and a first UPnP media server 105 through the unidirectional virtual communication channel.

The second extensible home connector 201 receives a response message for search-request directly from the second UPnP media renderer 203 and the second UPnP media device 205 belonging to a UPnP network of the second extensible home connector 201. Also, the second extensible home connector 201 receives a response message from the first UPnP media renderer 103 and the first UPnP media server 105 through the generated unidirectional virtual communication channel from the first extensible home connector 101 to the second extensible home connector 201

Among the first and second UPnP media renderers 103 and 203 and the first and second UPnP media servers 105 and 205, a user browses contents of the first UPnP media server 105 located in the first home 100 through a virtual communication channel.

When a user selects predetermined contents from the browsed contents, the second extensible home connector 201 searches a first UPnP Internet gateway 107, which is located on a UPnP network of the first UPnP media server 105 having the selected contents, and transmits a control message for opening an external port of the searched first UPnP Internet gateway 106 through a virtual communication channel.

Then, a first UPnP Internet gateway 107 opens an external port by the received control message and responds to the second extensible home connector 201 that requests an IP address and an opened port number of the first UPnP Internet gateway 107.

The second extensible home connector 201 requests the second UPnP media renderer 203 to play media using the receiving IP address and opened port number, and the second UPnP media renderer 203 transmits a media transmit request message to a second UPnP Internet gateway 207 for requesting the second UPnP Internet gateway 207 to transmit media to the IP address and opened port number.

The media transmission message is transmitted to the first UPnP media server 105 passing through the second UPnP Internet gateway 207. After receiving the message, the first UPnP media server 105 transmits media data to the first UPnP media renderer 103.

Then, the second UPnP media renderer 203 and the second UPnP media server 205 receives multimedia data streaming between the first UPnP media renderer 103 and the first UPnP media server 105 through the opened port and the second UPnP Internet gate way 207.

Here, the first extensible home connector 101 regularly monitors states of opened ports and the second extensible home connector 201 by storing information about the opened port and the second extensible home connector 201 which requests a port to be opened into an extensible home client management table. If a connection allowing time of the second extensible home connector 201 is expired or if the connection thereof ends, the first extensible home connector 101 deletes information about the second extensible home connector 201 from the extensible home client management table. Also, the first extensible home connector 101 closes external ports not in use through controlling the UPnP Internet gateway by searching the extensible home connection management table.

Figure 2:
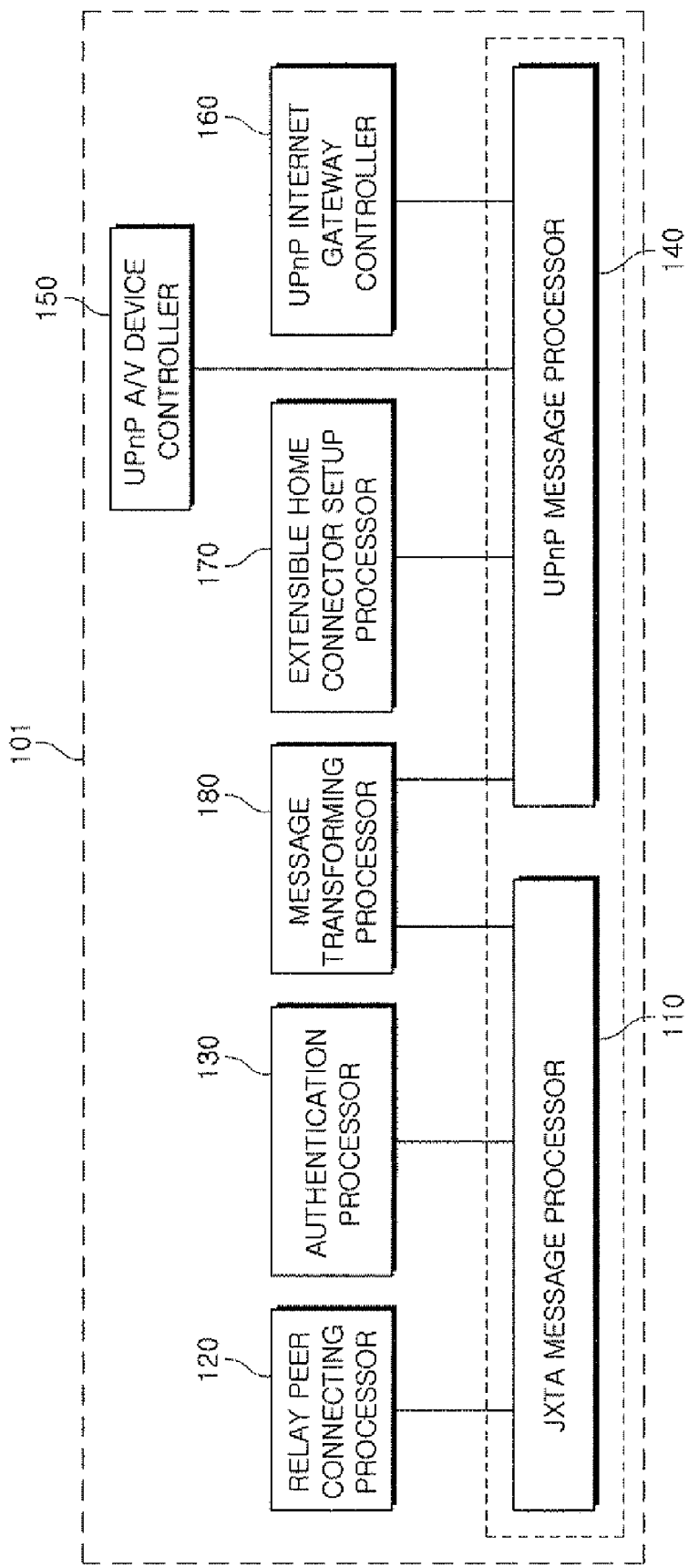
FIG. 2 is a diagram illustrating an internal structure of a first and second extensible home connector shown in FIG. 1.

FIG. 2 is a diagram illustrating an internal structure of first and second extensible home connectors shown in FIG. 1. Here, the first and second extensible home connectors 101 and 201 have the same internal structure.

A JXTA message processor 110 accesses a JXTA based terminal-to-terminal communication network and transmits and receives a JXTA message.

A relay peer connecting processor 120 establishe a connection with a relay peer 300 based on the JXTA message processor 110, processes a message transmitted from the relay peer 300, and generates a message to be transmitted to the relay peer 300.

An authentication processor 130 connects an extensible home connector located in a hetero UPnP network to a terminal through a virtual communication channel based on the JXTA message processor 110 and performs a mutual authentication process.

The UPnP message processor 140 transmits and receives an UPnP message in a local network which is isolated from the outside by a network address converter or a fire wall.

The UPnP audio/video (A/V) device controller 150 finds and controls UPnP A/V devices in hetero UPnP networks based on the UPnP message processor 140, and processes events generated therefrom. Here, the A/V device denotes the UPnP media servers 105 and 205 and the UPnP media renderers 103 and 203.

The UPnP Internet gateway controller 160 controls a UPnP Internet gateway based on the UPnP message processor 140 to open and close an external port for multimedia streaming.

The extensible home connector setup processor 170 sets up configuration information of an extensible home connector based on a UPnP protocol.

A message transforming processor 180 includes a UPnP message into a JXTA message on a local UPnP network and transmits the JXTA message in order to relay the UPnP message between hetero UPnP networks.

FIG. 3 is a flowchart illustrating a method for providing a multimedia service between hetero UPnP networks according to an embodiment of the present invention.

The present invention relates to a method for controlling physically separated UPnP A/V devices and providing a streaming service therebetween using two separated channels which are a control channel for finding and controlling a UPnP device and transmitting an event message and a data channel for streaming multimedia data between home networks isolated from the outside by a network address converter or a fire wall.

In the method according to the present embodiment, an extensible home connector establishes a communication channel to a relay peer to receive a message relaying and propagating service in operation S10.

In operation S20, channel information of the extensible home connector is advertised through the communication channel between the extensible home connector and the relay peer, a virtual communication channel between extensible home connectors is generated using received channel information, and an authentication process is performed.

In operation S30, a UPnP A/V media renderer and a media server are searched in a UPnP network of the extensible home connectors through a virtual communication channel that connects the extensible home connectors in a terminal-to-terminal manner, and contents stored in the media server are searched.

In operation S40, an external port accessible to an external device is opened by controlling a UPnP Internet gate way connected to the extensible home connector for streaming searched contents from the UPnP media server to the media renderer crossing a network address converter or a fire wall.

In operation S50, multimedia data is streamed between a UPnP media server and a renderer through the opened port.

In operation S60, ports not in use are monitored and automatically closed to prevent illegal entry through the opened external port for streaming multimedia.

In the step S10, an extensible home connector requests a connection with a relay peer.

Then, the relay peer transmits a connection allowing time for allowing a connection with the extensible home connector as a response for the connection request.

The extensible home connector constantly determines whether the received connection allowing time is expired or not and requests re-connection with the relay peer before the connection allowing time is expired.

In the step S20, an extensible home connecting server generates channel information and a virtual receiving channel for the generated channel information.

Then, the extensible home connecting server advertises the generated channel information to the relay peer.

A home connecting client searches the channel information that is advertised through the relay peer.

The extensible home connecting client generates a virtual transmitting channel using the searched channel information and establishes a unidirectional virtual communication channel from the extensible home connecting client to the extensible home connecting server by binding the generated virtual transmitting channel to the virtual receiving channel generated by the extensible home connecting server.

The extensible home connection client generates channel information and generates a virtual receiving channel for the advertisement.

The extensible home connecting client transmits an authentication inquiry message having the generated channel information of the extensible home connecting client to the extensible home connecting server through the generated unidirectional virtual communication channel from the extensible home connecting client and the extensible home connecting server The extensible home connecting server using the transmitted authentication inquiry message authenticates the extensible home connecting client.

If the extensible home connecting client is normally authenticated, the extensible home connection server generates a virtual transmitting channel using the received channel information of the extensible home connecting client and establishes a unidirectional virtual communication channel from the extensible home connecting server to the extensible home connecting client by binding the generated virtual transmitting channel with the virtual receiving channel of the extensible home client.

Then, an authentication response message is transmitted through the unidirectional virtual communication channel from the extensible home connecting server to the extensible home connecting client.

The extensible home connecting client authenticates the extensible home connecting server using the transmitted authentication response message.

In the step S30, additional operations are performed as follows. The extensible home connecting client requests searching not only a UPnP A/V device in an own UPnP network of the extensible home connecting client but also UPnP A/V devices in a UPnP network of the extensible home connecting server through the unidirectional virtual communication channel from the extensible home connecting client to the extensible home connecting server, which is generated in the step S20.

The extensible home connecting client directly receives a response messages for the search request from the UPnP A/V devices in the UPnP network of the extensible home connecting client and also receives response messages from the UPnP A/V devices in the UPnP network of the extensible home connecting server through the unidirectional virtual communication channel from the extensible home connecting server to the extensible home connecting client, which is generated in the step S20.

Among the searched UPnP A/V devices, contents of a UPnP media server are browsed through the generated virtual communication channel by performing the step S20.

Here, the authentication inquiry message includes an identification number of the extensible home connecting client, a random constant generated by the extensible home connecting client, an encrypted client session key, and a message authentication code. The authentication response message includes a random constant generated by an extensible home connecting server, an encrypted server session key, and a message authentication key.

In the step S40, additional operations are performed as follows. Predetermined contents are selected from the contents browsed in the step S30.

A UPnP Internet gateway, which is located on a UPnP network of a UPnP media server having the selected contents, is searched.

A control message for opening an external port of the searched UPnP Internet gateway is transmitted through a virtual communication channel.

An external port, which is requested by the UPnP Internet gate way that receives the control message, is opened and a response message is transmitted to an extensible home connecting client who requests an IP address and a number of the opened port.

Here, if the selected UPnP media server and the selected media renderer for playing contents are located in the same UPnP network, an extensible home connecting client does not perform an operation of searching a UPnP Internet gateway, an operation of transmitting contents through a virtual communication channel, and an operation of responding to a home connecting client.

In the step S50, additional operations are performed as follows. The extensible home connecting client transmits a media playing request message to a UPnP media renderer in order to request the UPnP media renderer to play media using the IP address and the open port number which are received by performing the step S40.

The UPnP media render that receives the media playing request message requests media transmission to an IP address and an opened port number included in a request message.

A media transmission message is transferred to a UPnP media server through a UPnP gateway with the IP address and the opened port number converted to a private IP and an internal port number.

The UPnP media server receiving the media transmission message transmits media data to the UPnP media renderer.

In the step S60, additional operations are performed as follows. The extensible home connecting server stores information about the extensible home connecting client and the opened port in an extensible home client management table and monitoring states thereof regularly.

If the connecting allowing time is expired, or if the connection ends, the extensible home connecting server deletes information about a corresponding extensible home connection client from the extensible home client management table.

The extensible home connecting server closes external ports not in use through controlling a UPnP Internet gateway by searching the extensible home connecting management table. Here, the extensible home connecting client management table is used to manage information of mapping opened external ports and extensible home connecting clients using the same.

As described above, the system and method for providing a multimedia service between hetero UPnP networks according to the present invention safely streams multimedia data between UPnP devices while a user moves between different home networks each of which is isolated from the outside by a network address converter and a fire wall. Using the system and method for providing a multimedia service between hetero UPnP networks according to the present invention, a user is enabled to play multimedia data in the user's home using a TV, a media renderer, located at other person's home through multimedia data streaming by connecting the user's home UPnP network to other person's home UPnP network through a virtual UPnP network and when the user visits an neighbor, a relative, or a friend. Also, the user is enabled to safely play multimedia stored in a media server in other's UPnP network using a media render located in the user's home through a virtual communication channel.

Also, the system and method for providing a multimedia service between hetero UPnP networks according to the present invention enables a user to easily access and play multimedia data in a user's home UPnP network through other person's UPnP network, thereby maximizing convenience of the user.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for providing a multimedia service between hetero UPnP networks, the method comprising:
   establishing a first communication channel with a specific extensible home connector selected from a plurality of extensible home connectors through a relay peer;
   searching multimedia data to play from multimedia data in a specific UPnP network, which the specific extensible home connector is located on through the first communication channel;
   establishing a second communication channel through a UPnP internet gateway in the specific UPnP network in case of demanding play of a specific multimedia data; and
   receiving the specific multimedia data from a UPnP media server in the specific UPnP network through the second communication channel,
   wherein the establishing of the first communication channel comprises:
   generating a virtual transmission channel by using channel information which the specific extensible home connector advertises;
   generating a one-way communication channel by binding the virtual transmission channel with a virtual transmission channel of the specific extensible home connector;
   transmitting to the specific extensible home connector through the one-way communication channel a authentication inquiry message which includes virtual reception channel information of the one-way communication channel; and
   authenticating the specific extensible home connector by using a authentication response message transmitted from the specific extensible home connector when authentication is normally finished through the authentication inquiry message.

2. The method of claim 1, wherein the specific extensible home connector generates the one-way communication channel when authentication is normally finished through the authentication inquiry message.

3. The method of claim 1, wherein the authentication inquiry message comprises an identification number of the extensible home connector, a random constant generated by the extensible home connector, an encrypted client session key, and a message authentication code.

4. The method of claim 1, wherein the authentication response message comprises a random constant generated by the specific extensible home connector, an encrypted server session key, and a message authentication code.

5. The method of claim 1, wherein the establishing of the second communication channel comprises:
   selecting the specific multimedia data to play from the searched multimedia data;
   searching a UPnP Internet gateway which is located on the specific UPnP network of the UPnP media server having the selected multimedia data;
   transmitting a control message for opening an external port of the UPnP Internet gateway through the first communication channel;
   receiving an IP address and an opened port number of the UPnP Internet gateway; and
   establishing the second communication channel to request the specific multimedia data to the IP address and the opened port number.

6. The method of claim 1, wherein the specific extensible home connector monitors and automatically closes ports not in use for preventing illegal entry made through opened external ports during treating multimedia data.

7. An apparatus for streaming multimedia data between UPnP (Universal Plug & Play) networks each having a private network by connecting relay peers, the apparatus comprising:
   a message processor to transmit and receive a JXTA (juxtapose) message composed of a UPnP message in the private network isolated from the outside by accessing a JXTA based terminal-to-terminal communication network;
   a relay peer connecting processor to establish a connection with the relay peers based on the message processor; and
   a gateway controller to confirm and to control UPnP audio/video (AN) devices in each of the other UPnP networks, to process generated events by each of the UPnP AN devices, and to control a UPnP Internet gateway of each of the UPnP networks to open and close external ports of the UPnP Internet gateway based on the message processor.

8. The apparatus of claim 7, further comprising:
   an extensible home connector setup processor to establish configure information of an extensible home connector as based on a UPnP protocol; and
   a message transforming processor to transmit the JXTA message composed of UPnP message on a local UPnP network to relay a UPnP message between the UPnP networks.

9. The apparatus of claim 8, wherein the extensible home connector setup processor deletes prestored information about a corresponding extensible home connector from an extensible home connector management table when a connection allowing time of an extensible home connector connected through UPnP networks is expired or when the connection ends.

10. The apparatus of claim 7, further comprising an authentication processor to perform a mutual authentication process by establishing a terminal-to-terminal virtual communication channel to an extensible home connector located in each of the other UPnP networks based on the message processor.

11. The apparatus of claim 8, wherein the extensible home connector is operated as an extensible home connecting server when the extensible home connector provides connection to an own UPnP network, where the extensible home connector is located, from another UPnP networks and provides an extensible home connection service to another extensible home connectors, and
   the extensible home connector is operated as an extensible home connecting client when the extensible home connector requests connection with another extensible home connectors located in another UPnP networks.

12. The apparatus of claim 7, wherein the gateway controller controls an opened external port not in use to be closed.

* * * * *